June 28, 1938.  W. R. McKENNA  2,122,259

FILTER PRESS

Filed April 23, 1937  3 Sheets-Sheet 2

William R. McKenna INVENTOR.

BY

J. M. Castle Jr.
ATTORNEY.

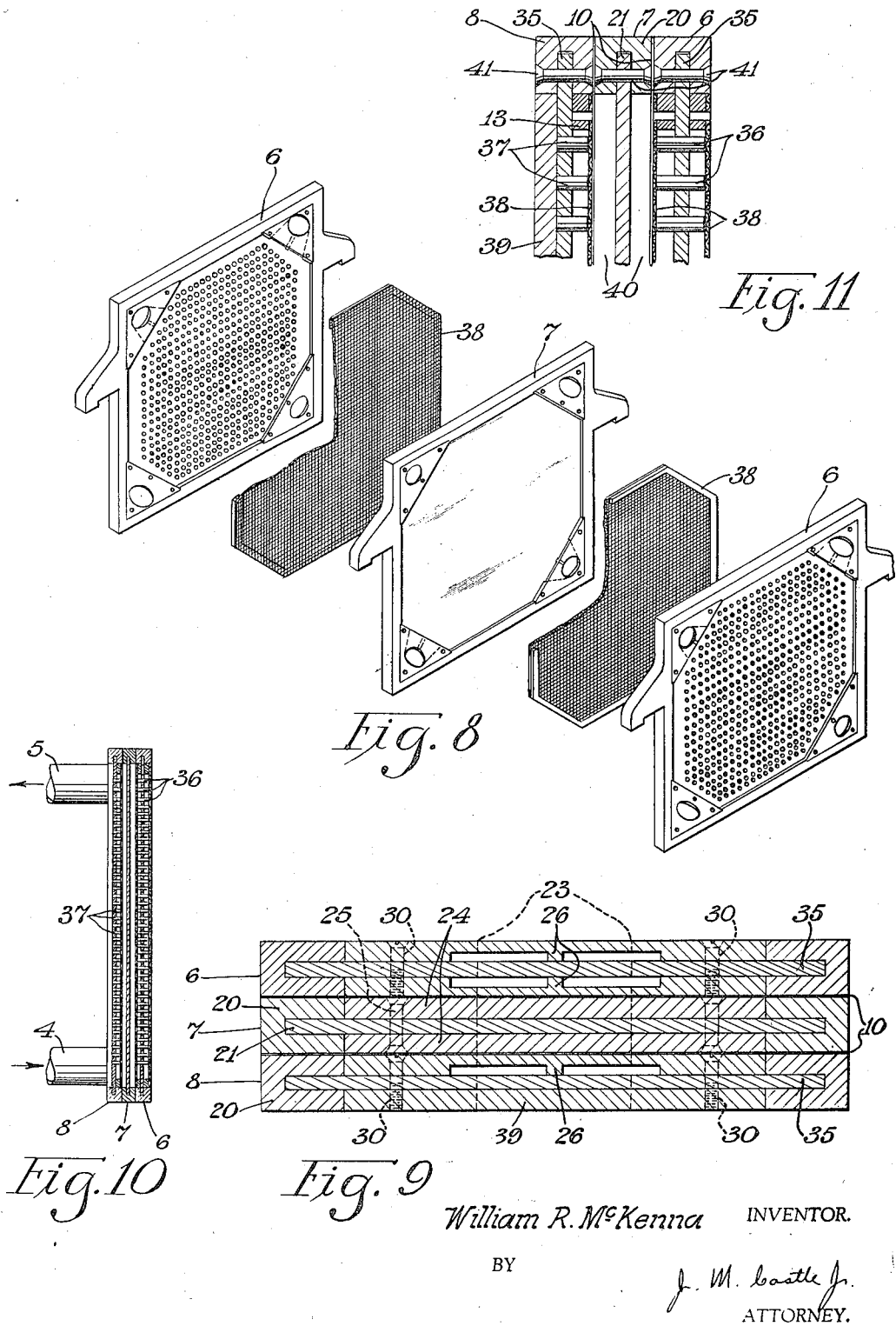

Patented June 28, 1938

2,122,259

UNITED STATES PATENT OFFICE 2,122,259

FILTER PRESS

William R. McKenna, Wilmington, Del., assignor to E. I. du Pont de Nemours & Company, Wilmington, Del., a corporation of Delaware Application April 23, 1937, Serial No. 138,572

6 Claims. (Cl. 210—188)

This invention relates to filter presses and, more particularly, to filter presses adapted for filtering colloids and to the construction of the plates and frames used in such presses.

In the removal of foreign matter from colloids of cellulose derivatives and other plastics it has been customary heretofore to use filter presses of the so-called "plate and frame" type. Generally, these colloids to be filtered are relatively heavy or stiff, being subject to pressures in the neighborhood of 400 pounds per square inch, and, consequently, the filter cloth has been laid on a wire screen which is placed against the filter plate, the conventional projections on the filter plate supporting the screen against the pressure of the colloid being forced through it.

These presses have been of the "corner feed and delivery" type. That is, in the assembled press holes in each corner of the plates and frames form continuous circular passages running the length of the press, the lower two holes in each frame having channels through which the colloid is forced into the chambers formed by the frames, while the upper two holes in each plate have similar channels through which the colloid, having passed through the filter cloth and screen, is forced out into circular delivery passages at the top of the press.

Heretofore both plates and frames have been made of cast metal with the channels communicating with the circular feed and delivery passages, cast in the solid metal of the plate or frame. These slot-like channels, which are necessarily quite flat, have been highly objectionable due to the difficulty in cleaning out colloid and, where it is desired to use the press for filtering different kinds of colloid, the only practical procedure was to have separate sets of frames and plates for each type of colloid to be filtered. A further disadvantage of the heretofore conventional plates to frames of cast metal has been their relatively poor resistance to the chemical action of the colloid.

An object of the present invention is to provide an improved type of filter press plate and frame for use particularly in filtering colloids. A further object is to provide filter press plates and frames which may be readily cleaned so that their use for filtering different types of colloid is feasible. A further object is to provide such plates and frames which are far better adapted to resist the chemical action of colloids without involving an appreciable increase in cost. Other objects of the invention will be apparent from the description given hereinafter.

The above objects are accomplished according to the present invention by using, instead of the conventional cast metal filter press plate or frame, a plate or frame comprising a sheet of rolled metal in a bar frame and separate triangular corner plates readily assembled and disassembled, the corner plates at the corners where colloid is to pass into or out of the circular corner feed and delivery passages having shallow channels cut in their faces which are assembled adjacent the sheet of rolled metal. Further, the plates are provided with projections by drilling holes therein and driving rolled steel pins into the holes to such distance that the pins protrude equally on both sides of the plates. In this manner the prohibitive cost of using a rolled metal sheet the thickness of the length of the desired projections on both sides of the finished filter press plates and then milling out the plates to form the projections, is avoided.

The invention will be more fully described with reference to the accompanying drawings wherein:

Fig. 8 is an "exploded" view, in perspective, showing the arrangement of filter press plate, screen, and frame;

Fig. 9 is an enlarged section on the line A—A of Figs. 5 and 6 taken through a series of two filter press plates and a filter press frame assembled in operative position;

Fig. 10 is a vertical section through the center of a series of two filter press plates and a filter press frame assembled in operative position;

Fig. 11 is an enlarged fragmentary view of the upper portion of Fig. 10, showing details of construction more clearly.

Figure 1:
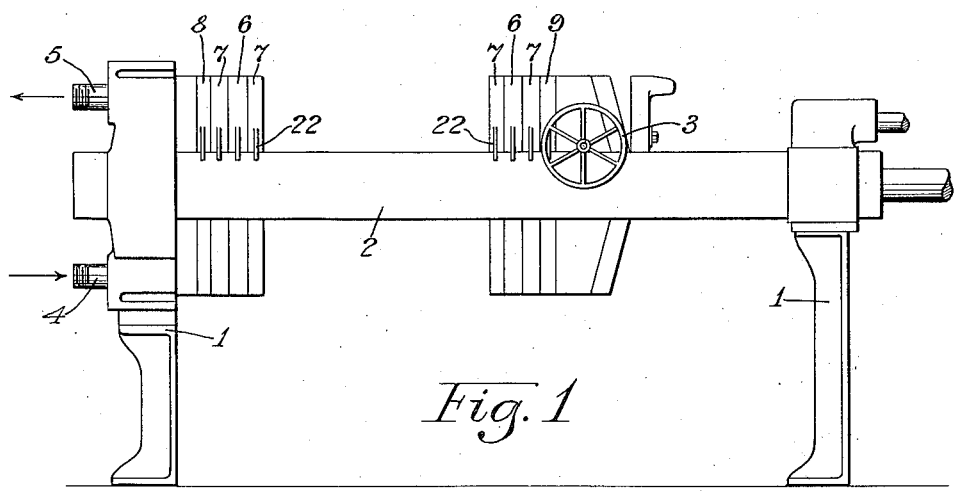
Fig. 1 is a side elevation, more or less diagrammatic, of a "plate and frame" type filter press of conventional design.

Referring to Fig. 1, the conventional filter press illustrated comprises the standards 1, 1, horizontal support bars 2 (only one of which is shown), and a conventional mechanical device indicated at 3 to force the filter press plates and frames together. Feed conduits 4 and delivery conduits 5 (only one of each being shown) are provided for feeding the colloid to the press at the two bottom corners and delivering the filtered colloid from the two top corners to the point of use. It will be understood that these conduits communicate with the circular passages formed by holes cut in each corner of the plates 6 and frames 7 carried by the support bars 2 in the usual manner. In the assembled filter press there will be one more plate than frame as the lead-in plate 8 and follower plate 9 are actually only half a plate each in so far as their filtering function is concerned.

The general arrangement of the plates, frames, screens, and filter cloths is the same in the filter press of the present invention as heretofore has been conventional.

Figure 2:
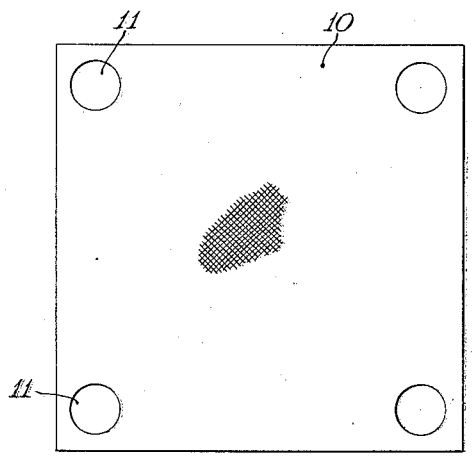
Fig. 2 is a front elevation of a filter cloth cut to fit in the filter press of the present invention.

Fig. 2 illustrates a conventional filter cloth 10 with holes 11 cut therein to correspond with the holes in each corner of the plates and frames. The filter cloth 10 functions as a gasket to prevent colloid from leaking out between the plates and frames, as well as to filter the colloid.

Figure 3:
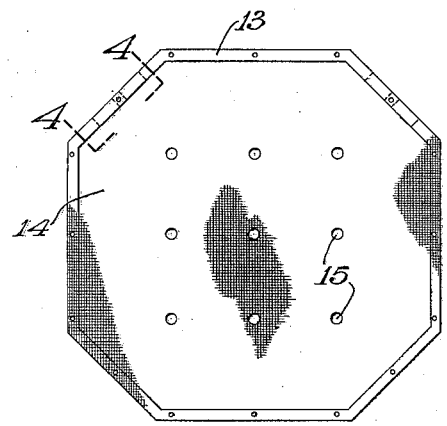
Fig. 3 is a front elevation of a screen adapted to fit in the filter press of the present invention.
Figure 4:
Fig. 4 is a section on the line 4—4 of Fig. 3.

Fig. 3 shows a screen against which the filter cloth is laid. This screen comprises the metal bar frame 13, and the screening 14. The screen is made octagonal in shape, or rather, with the corners cut off, so that it will fit flush against the filter press plate and not overlap the corner plates of the filter press plate hereinafter to be described. The screen is provided with nine holes 15 through which bolts pass to hold the screen against the filter press plate. As shown in Fig. 4, the bar frame 13 is provided with a pair of groves 12 at each side at the top which are adapted to register with the delivery channels in the associated filter press plate to be described below and not block passage of the filtered colloid out into the delivery passages extending throughout the length of the filter press at the top thereof.

Figure 5:
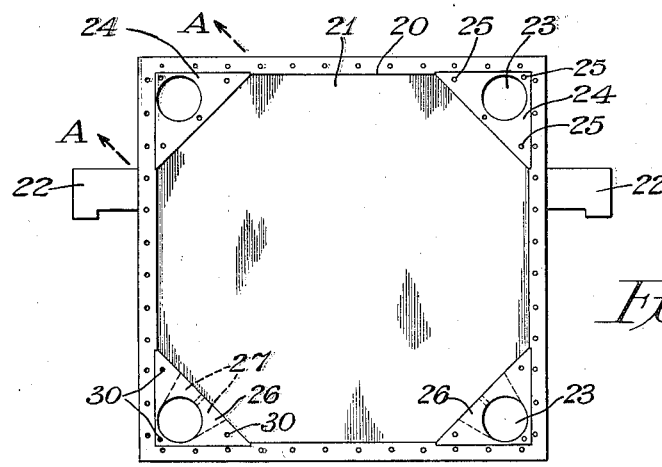
Fig. 5 is a front elevation of a filter press frame according to the present invention.
Figure 6:
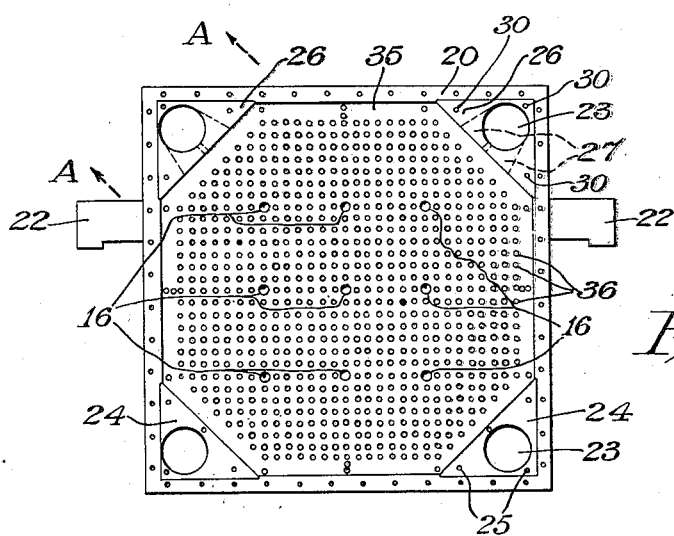
Fig. 6 is a front elevation of a filter press plate according to the present invention.

In Fig. 5 is shown a filter press frame and in Fig. 6 a filter press plate which are generally similar in construction and indicated by reference numerals 7 and 6, respectively, in Figs. 1, 8, 9, 10, and 11. In Fig. 5, the filter press frame comprises a bar frame 20 holding a relatively thin solid rolled metal sheet 21. The usual lugs 22, 22 for supporting the frame on the horizontal support bars of the filter press are carried by the bar frame 20. In each corner of the frame triangular corner plates are mounted on each side of the sheet 21, the corner plates being of such thickness that, when mounted, their faces are flush with the face of the bar frame 20 so that the filter press frame can be forced tight against the adjacent filter press plate with a filter cloth intervening, of course, and acting as a gasket. Holes 23 are provided in the corner plates and in each corner of the metal sheet 21 to provide annular passages through the filter press frame which register with similar passages in the other frames and plates to form the feed and delivery passages extending the length of the filter press.

The corner plates 24 at the upper corners of the filter press frame in Fig. 5 are not grooved and may be permanently riveted in place by a plurality of rivets 25 passing through the metal sheet 21 and the corner plates on each side thereof. The rivets are shown in detail in Fig. 9. These corner plates 24 block off passage of colloid from the chambers formed by the filter press frame and the associated plates on each side of it, into the circular delivery passages extending along the top of the filter press.

Figure 7:
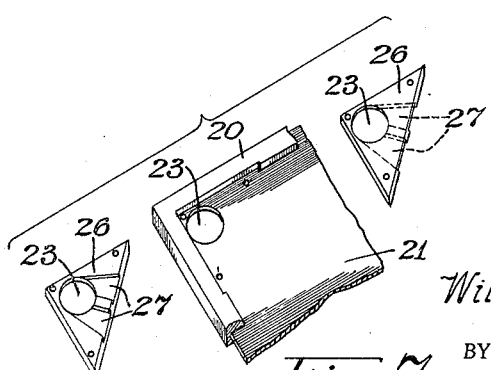
Fig. 7 is an "exploded" view, in perspective, of the corner construction of either the filter press frame of Fig. 5 or the filter press plate of Fig. 6.

The corner plates 26 at the lower corners of the filter press frame in Fig. 5 are provided with a pair of wide grooves 27 in their faces to be mounted adjacent the metal sheet 21, said grooves 27 extending from the holes 23 provided in the corner plates 26 to the inner edges of the corner plates as indicated by dotted line in Fig. 5 and shown in detail in Fig. 7. Instead of being riveted as corner plates 24 are, the corner plates 26 are mounted by means of three screws 30 passing through a corner plate 26 on one side of metal sheet 21, through sheet 21, and being screwed into the corner plate 26 on the opposite side of metal sheet 21. This is illustrated clearly in Fig. 9 with respect to the filter press plate 6 which comprises the identical structure.

When the corner plates 26 are assembled, it will be apparent that the grooves 27 form shallow channels extending from the annular feed passage running the length of the filter press at the lower two corners into the two chambers formed by the filter press frame and the two adjacent filter press plates. This arrangement can be better visualized by reference to Fig. 8 in which the arrangement of filter press frames, plates, and screens is shown, the filter press cloths having been omitted for the sake of clarity.

The filter press plate shown in Fig. 6 comprises the identical construction used in the filter press frame shown in Fig. 5 except that the triangular corner plates 24 are mounted in the lower corners and the grooved triangular corner plates 26 in the upper corners of the plate. By reversing the positions of the triangular corners in this manner, flow of colloid from the circular feed passages is blocked by the corner plates 24 while flow of colloid, after passing through the filter cloth 10, out into the delivery passages at the top of the filter press is permitted because of the grooves in the corner plates 26.

The rolled metal sheet 35 in the filter press plate is similar to the sheet 21 used in the filter press frame except that it is provided with a plurality of holes into which are driven the rolled steel pins 36 which extend equally on each side of the sheet 35 for such distance that the screen can bear against them and fit flush with the surfaces of the triangular corner plates and the bar frame 20 of the filter press plate. Also, the sheet 35 is provided with nine holes 16 which are adapted to register with holes 15 (see Fig. 3) in the pair of screens assembled on each side of the plate. Bolts or any equivalent means (not shown) are passed through the registered holes of a plate and associated screens to keep the screens against the pins 36.

Fig. 8 shows the arrangement of plates, screens, and frames in perspective and Fig. 10 shows a section through the center of assembled plates, screens, and frames. The details of the assembly are made clear in Figs. 9 and 11 which also bring out the difference between the lead-in plate 8 and the other plates in the filter press, except the follower plate 9 (see Fig. 1) which is similar to the lead-in plate 8.

Referring particularly to Figs. 9 and 11, the lead-in plate 8 is similar to the other filter press plates as illustrated in Fig. 6 and designated by reference numeral 6 in Figs. 9 and 11, except that it has pins 37 extending on one side only (see Fig. 11) and has a cast metal backing plate 39 riveted to the metal sheet 35 carrying the pins 37. The lead-in plate fits flush against the head of the filter press when assembled. Since only the side of the lead-in plate on which the pins 37 extend is used for filtering, the corner plates 24 and 26 are mounted on that side only. The backing plate 39 does not come in contact with the colloid and hence may be made of cast metal for economy.

Looking at Fig. 9, the grooved corner plates 26 assembled with the lead-in plate 8 and filter press plate 6 provide shallow channels communicating with the circular delivery passage (indicated by dotted lines) at the upper corner of the filter press of which Fig. 9 is a section, to permit the colloid which has been forced through filter cloth 10 and screen 38 (see Fig. 11) to flow out into the delivery conduit 5 (Fig. 1) and then to the point of use. Similarly, at the lower corners of the filter press, the grooved corner plates 26 assembled with the filter press frame 7 permit the colloid to pass from the circular feed passages into the chambers 40 (see Fig. 11) formed by the frame 7.

Fig. 11 shows in detail the screens 38 resting on the pins 37 of lead-in plate 8 and pins 36 on both sides of filter press plate 6. The rivets 41 holding the rolled metal sheet 21 of the frame 7 and the rolled metal sheets 35 of the plate 6 and lead-in plate 8 in their respective bar frames 20, are also shown in detail and the fact that the screening 14 of the screen 38 is mounted flush on one side of the bar frame 13.

While the assembly of the various elements in the filter press of the present invention has been illustrated and explained in some detail in order that those skilled in the art may understand the construction in the preferred specific embodiment of the invention, the invention primarily resides in the construction of the filter press plates and frames. The general assembly of the filter press, the path of the colloid through it, and the manner of operating the filter press do not differ essentially from the heretofore used processes.

To illustrate the type of construction found satisfactory in the plates and frames of the present invention adapted for use in filtering cellulose derivative colloids, a rolled chrome nickel steel sheet ¼" in thickness is employed in a plate or frame 25" x 25" in overall dimensions. Rolled steel pins of the same alloy ¼" in diameter and 1⅛" in length are used in the plates, the pins extending $\tfrac{7}{16}$" on each side. The corner plates are made of similar alloy and ⅜" in thickness, the grooved ones (indicated by reference numeral 26 in the drawings) being provided with two grooves $\tfrac{3}{16}$" deep and of an average width of about 1¾". The dimensions are merely given for purposes of illustration and may be widely varied without departing from the scope of the invention. Likewise, the invention is not restricted to the use of any particular alloy; many alloys of suitable properties for use in the present invention will be known by those skilled in the art.

It has been found that the closer grained rolled metal is greatly superior to cast metal in resistance to the chemical action of the various colloids to be filtered in the plastics industry. However, if the practice heretofore used were followed and a relatively thick sheet of rolled metal were taken and milled out to form the conventional projections on which the screen rests, the cost would be prohibitive. By the use of a relatively thin sheet of rolled metal and the pins of rolled metal fitted therein, a great economy is effected. Due to the fact that the pressure on the pins will be the same on both sides of the plate, it is not necessary that the pins be secured more than is obtained by a drive or push fit. In the case of the lead-in or follower plate, a cast metal backing plate is used to hold the pins solid against the pressure which is only on one side of these two end plates.

An advantage of the triangular corner plates of the present invention will be apparent to those skilled in the art. As stated above, the narrow channels communicating with the circular feed and delivery passages extending along the top and bottom of the filter press have heretofore been practically impossible to clean thoroughly. By employing the readily disassembled and assembled construction of the present invention, it is a simple matter to remove the grooved triangular corner plates by unscrewing the three screws that hold them in place and thus enabling the parts to be cleaned thoroughly without any difficulty at all.

The filter press plates and frames of the present invention are adapted to be used in "corner feed and delivery" "plate and frame" filter presses generally but are particularly adapted for use in those filter presses where colloids tending to have a corrosive action on cast metal, are to be filtered. The ease with which the plates and frames may be cleaned, hence making the same set of plates and frames usable for filtering different colloids and the fact that the plates and frames, although economical to construct, exhibit greatly improved resistance to the chemical action of the colloid being filtered, constitute two outstanding advantages of the present invention.

As many apparently widely different embodiments of this invention may be made without departing from the spirit and scope thereof, it is to be understood that the invention is not limited to the specific embodiments thereof except as defined in the appended claims.

I claim:

1. A filter press element for use in a corner feed and delivery type filter press made up of a series of frame elements and plate elements assembled together with interposed screens, said element comprising a rectangular bar frame, a rectangular metal sheet mounted in said bar frame and provided with an opening in each corner to permit flow of material through said filter press element, and corner plates mounted on each side of said metal sheet at the corners thereof, said corner plates being provided with openings registering with associated openings in said metal sheet, the corner plates at the corners where material is to pass out of or into the corner feed and delivery passages of the filter press being readily demountable and having grooves in the faces thereof adjacent said metal sheet, said grooves extending from the openings in said corner plates to the inner edges thereof.

2. A filter press element for use in a corner feed and delivery type filter press made up of a series of frame elements and plate elements assembled together with interposed screens, said element comprising a rectangular bar frame, a rectangular rolled metal sheet mounted in said bar frame and provided with a circular opening in each corner to permit flow of material through said filter press element, triangular corner plates mounted on each side of said metal sheet at the corners thereof, said corner plates being provided with circular openings registering with the associated circular openings in said metal sheet, the corner plates at the corners where material is to pass out of or into the corner feed and delivery passages of the filter press being readily demountable and having wide grooves in the faces thereof adjacent said metal sheet, said grooves extending from the circular openings in said corner plates to the inner edges thereof.

3. A filter press frame for use in a corner feed and delivery type filter press, comprising a rectangular bar frame, a rectangular metal sheet mounted in said bar frame and provided with an opening in each corner to permit flow of material through said filter press frame, two pair of triangular corner plates adapted to fit on each side of said metal sheet at the pair of corners thereof where material is to pass out of the corner feed passages of the filter press, screws passing through the corner plates on one side of said metal sheet and said metal sheet and being screwed into the corner plates on the opposite side of said metal sheet whereby each pair of corner plates is held in position but is readily demountable, said corner plates being provided with openings registering with the associated openings in said metal sheet and having grooves in the faces thereof adjacent said metal sheet, said grooves extending from the openings in said corner plates to the inner edges thereof, and a second pair of triangular corner plates mounted on each side of said metal sheet at the other pair of corners of said metal sheet, said latter corner plates likewise being provided with openings registering with the associated openings in said metal sheet.

4. A filter press frame for use in a corner feed and delivery type filter press, comprising a square bar frame, a square rolled metal sheet mounted in said bar frame and provided with a circular opening in each corner to permit flow of material through said filter press, two pair of triangular corner plates adapted to fit on each side of said metal sheet at the pair of corners thereof where material is to pass out of the corner feed passages of the filter press, screws passing through the corner plates on one side of said metal sheet and said metal sheet and being screwed into the corner plates on the opposite side of said metal sheet whereby each pair of corner plates is held in position but is readily demountable, said corner plates being provided with circular openings registering with the associated circular openings in said metal sheet and having wide grooves in the faces thereof adjacent said metal sheet, said grooves extending from the circular openings in said corner plates to the inner edges thereof, and a second pair of triangular corner plates mounted on each side of said metal sheet at the other pair of corners of said metal sheet, said latter corner plates likewise being provided with circular openings registering with the associated circular openings in said metal sheet.

5. In a corner feed and delivery type filter press made up of a series of filter press frames and plates assembled together with interposed screens, the combination of a filter press plate comprising a rectangular bar frame, a rectangular rolled metal sheet mounted in said bar frame, said metal sheet being provided with a plurality of holes therein, and rolled metal pins fitted into said holes, the length of said pins being greater than the thickness of said metal sheet and the pins projecting out an equal distance on both sides of said metal sheet, and a pair of screens assembled on opposite sides of said filter press plate, each screen bearing against and being supported by the ends of said pins projecting out of the metal sheet of said filter press plate on the side adjacent to said screen.

6. A filter press plate for use in a corner feed and delivery type filter press, comprising a rectangular bar frame, a rectangular rolled metal sheet mounted in said bar frame and provided with an opening in each corner to permit flow of material through said filter press plate, triangular corner plates mounted on each side of said metal sheet at the corners thereof, said corner plates being provided with openings registering with the associated openings in said metal sheet, the corner plates at the corners where material is to pass into the corner delivery passages of the filter press being readily demountable and having grooves in the faces thereof adjacent said metal sheet, said grooves extending from the openings in said corner plates to the inner edges thereof and said metal sheet being provided with a plurality of holes therein, and rolled metal pins fitted into said holes, the length of said pins being greater than the thickness of said metal sheet and the pins projecting at an equal distance on both sides of said metal sheet thereby forming a plurality of small supporting areas for the screens to be assembled adjacent each side of said filter press plate.

WILLIAM R. McKENNA.